United States Patent [19]

Koltveit

[11] 4,414,867
[45] * Nov. 15, 1983

[54] JOINTED TOOL

[76] Inventor: Arthur O. Koltveit, 1410 S. Sterling St., Streator, Ill. 61364

[ * ] Notice: The portion of the term of this patent subsequent to Jul. 14, 1998 has been disclaimed.

[21] Appl. No.: 283,016

[22] Filed: Jul. 13, 1981

Related U.S. Application Data

[63] Continuation-in-part of Ser. No. 52,450, Jun. 26, 1979, Pat. No. 4,277,992.

[51] Int. Cl.³ .............................................. B25B 13/00
[52] U.S. Cl. .................................................. 81/177 UJ
[58] Field of Search ...................... 81/177 UJ; 403/57

[56] References Cited

U.S. PATENT DOCUMENTS

| | | | |
|---|---|---|---|
| 868,454 | 10/1907 | Korth | 81/177 UJ X |
| 1,300,148 | 4/1919 | Evans | 81/177 UJ X |
| 1,361,130 | 12/1920 | York | 81/177 UJ X |
| 1,875,376 | 9/1932 | Hammer et al. | 81/177 UJ X |
| 2,796,619 | 6/1957 | Hammer | 81/177 UJ X |
| 2,964,980 | 12/1960 | Riley et al. | 81/177 UJ X |
| 3,663,044 | 5/1972 | Contreras et al. | 403/57 X |

Primary Examiner—James G. Smith

[57] ABSTRACT

Jointed tool having an upper portion which is rotated manually or by non-manual power means, a lower portion which rotates and has a work-piece contacting tool element, e.g., nut-gripping socket, screw driver point, drill bit, and the like, and a pin-mounted gimbal joint connecting the upper and lower portions thereof with the adjacent walls of the elements in the gimbal joint abutting each other during rotation to reduce torque applied to the gimbal joint pins, allowing thereby the lower portion to operate on work pieces at angles offset up to and over 40 degrees from their axes with minimum wear on the gimbal joint elements. In another embodiment the lower portion is merely a shaft transmitting rotation to another member, e.g., a universal joint of a vehicle, and the gimbal joint is enclosed allowing the same to be internally self-lubricating.

5 Claims, 7 Drawing Figures

JOINTED TOOL

BACKGROUND OF THE INVENTION

This application is a continuation-in-part application of applicant's copending application Ser. No. 52,450, filed June 26, 1979, now U.S. Pat. No. 4,277,992, issued July 14, 1981.

Tools which effect the desired working by rotating a work-piece tool element are widely used. Such tools include socket wrenches, screw drivers, drills and the like. In many instances it is desired or necessary that the work piece be contacted in a location where space limitations and/or operating conditions render it difficult or even impossible for a conventional tool having straight configurations along its length to reach. For such latter cases, it has been suggested to employ a jointed tool having an intermediate connection between the upper driving portion and the lower work-piece contacting portion which is provided by a conventional interlocked "U-joint" universal joint. Such tools while suitable for some applications have not proved to be totally satisfactory in being limited, due to the nature of "U-joint" universal joints, to cases wherein the offset angle of the upper portion to the axis of the lower portion is less than about 26 degrees, a limited amount of torque safely may be applied to the connecting pins, e.g., in manual tools, and/or internal lubrication of the joint is not necessary, i.e., extensive rotation over an extended time is not required. Examples of such prior tools are shown in U.S. Pat. Nos. 868,454; 1,300,148; 1,361,130; 1,875,376; and 2,964,980.

Accordingly, a search has continued in the art for a simple, versatile tool adapted to be utilized at offset angles greater than conventional jointed tools and further adapted to be efficiently employed with non-manual power equipment.

THE OBJECTS OF THE PRESENT INVENTION

Accordingly, it is a primary object of the present invention to provide an improved novel jointed tool.

Another object of the present invention is to provide an improved tool joint which advantageously is adapted to efficiently function at offset angles greater than conventional jointed tools.

An additional object of the present invention is to provide a novel tool joint which advantageously is adapted to operate at offset angles of up to and over 40 degrees and yet is adapted to be efficiently driven by non-manual power means.

Still a further object of the present invention is to provide a novel tool joint which is adapted to be efficiently operated either manually or non-manually at relatively large offset angles, and which yet is simple in construction, durable, and inexpensive to manufacture.

BRIEF DESCRIPTION OF THE DRAWINGS

The above and other objects are achieved and are features of the novel tool joint of the present invention which will be described hereinbelow in detail with particular reference being made to the accompanying drawings of which.

DESCRIPTION OF SPECIFIC EMBODIMENTS

Figure 1:
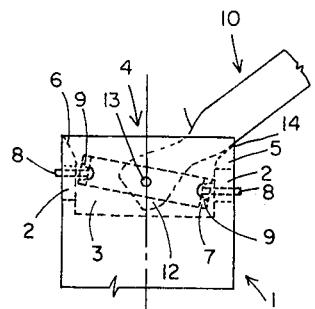
FIG. 1 is a diagramatic side view of a tool joint of the present invention.
Figure 2:
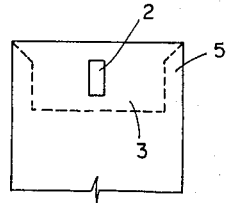
FIG. 2 is a partial end view of the embodiment of the tool joint shown in FIG. 1, illustrating the mounting slots of the gimbal joint pins.

With reference to FIG. 1, the tool joint of the present invention comprises an upper power drive portion, designated generally numeral 10, a lower work-piece contacting portion, designated generally numeral 1, and a pin-mounted gimbal connection means, designated generally numeral 4, the latter joining upper portion 10 to lower portion 1 so as to transmit at a constant velocity the rotation of upper portion 10 to lower portion 1. This latter feature which is a characteristic of the gimbal joint adapts the tool joint of the present invention for use with non-manual driving sources, with their usual higher speeds and torques, where conventional "U-joint" universal joint-containing jointed tools are not practical due to the rotational lag characteristic thereof imparting large shear stresses in the connecting pins thereof.

In accordance with the present invention, upper power drive portion 10 suitably may consist of a single unitary rotatable element which serves as the handle means for manually rotating portion 10 or as the means connectable to a source of non-manual power driving means, not shown, by conventional coupling means.

In accordance with the present invention, in gimbal connection means 4, the adjacent walls of the elements in the gimbal joint abut each other with contacting flat surfaces during rotation of the joint to thereby reduce torque applied to the gimbal joint pins.

In the embodiment shown in FIG. 1, gimbal joint means 4 is provided by lower end 12 of upper portion 10 being pivotally connected, by pin means 13, in the interior of ring element 7, with ring element 7 being, in turn, pivotally connected, by pin means 8, within an upper tubular section 5 of lower portion 1. The axes of pin means 8 and 13, when ring 7 is horizontal, are in a common plane and intersect at an angle of 90 degrees. Pin means 13 may be provided by a single pin passing entirely through ring element 7 and upper portion end 12; may be two separate pins which extend inwardly, from opposite sides, from the outside periphery of ring element 7, through ring element 7, and partially through upper portion end 12; or may be in the form of a conventional sideways protruding set of spring-biased B-B balls (i.e., as in conventional "snap-in" tool elements) which seat in dimples located on the insides of ring 7.

Figure 3:
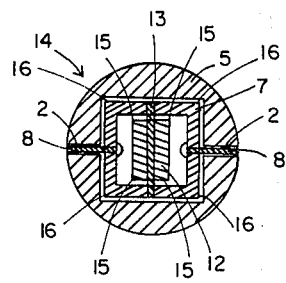
FIG. 3 is a sectional view, taken horizontally when the gimbal ring is in a horizontal position, of the joint shown in FIG. 1.

As shown in FIG. 3, the cross-sectional shape of end 12 is rectangular, i.e., the outside surfaces of end 12 are flat, and the inside of ring element 7 is of substantially the same shape, i.e., adjacent end 12 is flat, such that when torque is applied to end 12 in the operation of the joint, the corners of end 12 at 15 may contact and abut the inside periphery of ring element 7 and remove a portion of the shearing stresses imparted to pin means 13, thereby improving the durability of the joint. Similarly, shearing stresses imparted to pin means 8 are reduced by the outside periphery of ring element 7 being rectangular, i.e., flat, and the adjacent inside walls of tubular section 5 of lower portion 1 being substantially the same shape, i.e., flat, such that when torque is applied to ring element 7 in the operation of the joint, the corners of ring element 7 at 16 may contact and abut the inside periphery of tubular section 5, thereby further relieving stress on the joint and improving its durability.

In the more preferred embodiments of certain tools incorporating the joint of the present invention, additional efficiency of operation, e.g., an increased angle of attack is obtained, by either rounding the corners of end 12 in the areas where end 12 may come in contact with the lip of tubular section 5, i.e., rounding the same at 14 as shown in FIG. 1, and/or providing vertical slots 2 in the sides of tubular section 5 in which pin means 8 may travel up and down during the rotation of tubular section 5, thereby increasing the attainable angle at which upper portion 10 may cause rotation of lower portion 1 about its axis 20. In such latter embodiments, pin means 8 also may be provided with beveled slots 9 in ring element 7 to allow their desired movement.

In accordance with the present invention, the end 12 of upper portion 10 and upper section 5 of lower portion 1 need not be elements which are closed around 360 degrees of their periphery, but in some embodiments, such as that shown in FIGS. 4–7, may be constituted by spaced rectangular yoke pairs 31,32 and 21,22, respectively, with the yokes providing the portions required for attachment of the gimbal pins and abutment of the gimbal elements.

Figure 4:
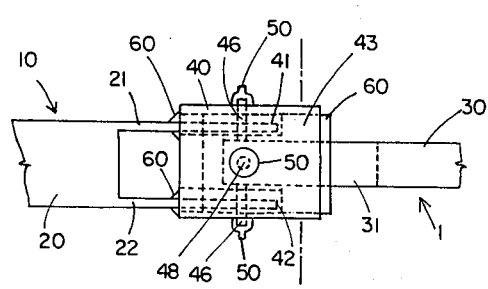
FIG. 4 is a diagramatic side view of another embodiment of the tool joint of the present invention, illustrating an enclosed gimbal joint.
Figure 5:
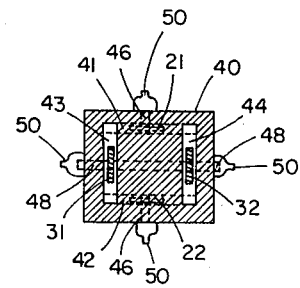
FIG. 5 is a sectional view of FIG. 4 taken along the dotted vertical line shown.
Figure 6:
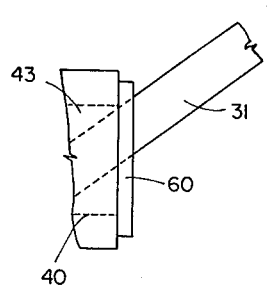
FIG. 6 is a partial side view of the joint shown in FIG. 4 illustrating the upper portion of the joint at an exaggerated angle and the cooperation of the sealing means of the joint therewith.
Figure 7:
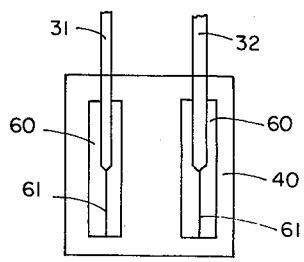
FIG. 7 is an end view of the joint shown in FIG. 6, further illustrating the cooperation of the sealing means of the joint with its angled shaft portion.

As shown in FIGS. 4–7, upper portion 10 consists of a shaft 30 from which extends a pair of rectangular, spaced yokes 31,32, and lower portion consists of a shaft 20 from which extends a pair of spaced, rectangular yokes 21,22, with such yoke pairs being connected by gimbal connection means 40. In such connection yokes 21,22 are connected within gimbal means 40 through pin means 46, and yokes 31,32 are connected within gimbal means 40, by pin means 48, with pin means 46 and 48 being in the same plane and having axes which intersect at 90 degrees. It can be seen that the gimbal connection of FIG. 4 is the same basically as that in FIG. 1, excepting for the yokes and the positioning of the yokes within the respective slots provided therefor in gimbal block means 40, i.e., yokes 21,22 in slots 41, 42, and yokes 31,32 in slots 43,44, respectively—such an arrangement providing an an enclosed gimbal connection in which the torque reduction features are retained, i.e., yokes 31,32 and 41,42 on their flat surfaces contact and abut the adjacent flat respective surfaces of their receiving slots upon rotation of the joint, and in which a further advantageous feature is provided.

In accordance with the present invention, in the more preferred embodiments of the joint employed as a rotational transmission means, the slots in which yokes 21,22 and 31,32 are located are provided at their outside openings with deformable, elastomeric coverings 60 having a slot 61 therein along which a yoke may move, with the coverings having an ability to "pucker" and close a particular slot opening yet allow for movement by a yoke. By this means, grease or other lubricating material may be placed within gimbal block 40 permanently or intermittantly through conventional Zerk fittings 50 positioned on the pin means of the joint, and the joint rendered self-lubricating.

What is claimed is:
1. A tool joint having a first portion for rotatably driving said joint, a second work-contacting portion, and a pin-mounted gimbal ring connection including outside and inside pin-like pivot means joining said first and second portions, the improvement in said gimbal connection comprising:
said second portion including a tubular section having a rectangular inner periphery, and,
said gimbal connection including a rectangular ring pivotally mounted within said tubular section by said outside pin-like pivot means in closely adjacent, spaced relation to said rectangular inner periphery,
whereby adjacent walls and surfaces of the joint abut each other during the rotation of said joint whereby torque normally exerted on the pins of said gimbal connection is relieved.
2. The tool joint according to claim 1 wherein said outside pin means of said gimbal connection are located in vertical slots in said tubular section so as to allow said pin means to move up and down during rotation of said joint.
3. The joint of claim 1 wherein said pin means includes a pair of cooperating spring-pressed balls and receiving detents to permit ready axial separation of the joint elements.
4. A joint having a first portion for rotatably driving said joint, a second driven portion extending from said joint, and a pin-mounted gimbal connection including pin-like pivot means interconnecting said first and second portions, the improvement therein comprising:
said gimbal connection including a surrounding block-like tubular housing having rectangular inner peripheral flat areas,
said gimbal connection further including an inner member having a rectangular outer peripheral flat areas mounted within said housing in closely spaced relation to said tubular housing,
said first and second portions respectively having yokes extending within and being connected to said housing and said inner member by said pin means between said housing inner peripheral flat areas and said inner member outer peripheral flat areas.
5. The joint of claim 4 including lubricant within said block-like housing, and further including flexible seal means carried by said housing and cooperatively associated with said yokes to retain lubricant therewithin.

* * * * *